United States Patent [19]
Kinberger

[11] 3,736,019
[45] May 29, 1973

[54] CAMPER

[76] Inventor: James E. Kinberger, P.O. Box 372, Stinson Beach, Calif.

[22] Filed: Oct. 19, 1970

[21] Appl. No.: 81,704

[52] U.S. Cl. ...........................296/23 MC, 296/99
[51] Int. Cl. .....................................B60p 3/32
[58] Field of Search ............296/23 MC, 23 R, 296/99

[56] References Cited
UNITED STATES PATENTS

| 3,507,536 | 4/1970 | Hall | 296/23 R |
| 3,169,792 | 2/1965 | Viquez | 296/99 |
| 3,469,881 | 9/1969 | McNamee | 296/23 MC |

*Primary Examiner*—Philip Goodman
*Attorney*—Gordon Wood

[57] ABSTRACT

A camper body for use with a truck having a driver's cab and a truck bed rearwardly of said cab. The camper body is designed to provide a relatively large sleeping space and a storage space and at the same time leave the major portion of the truck and truck bed free for use in its ordinary function of hauling articles.

7 Claims, 7 Drawing Figures

Patented May 29, 1973
3,736,019
2 Sheets-Sheet 1
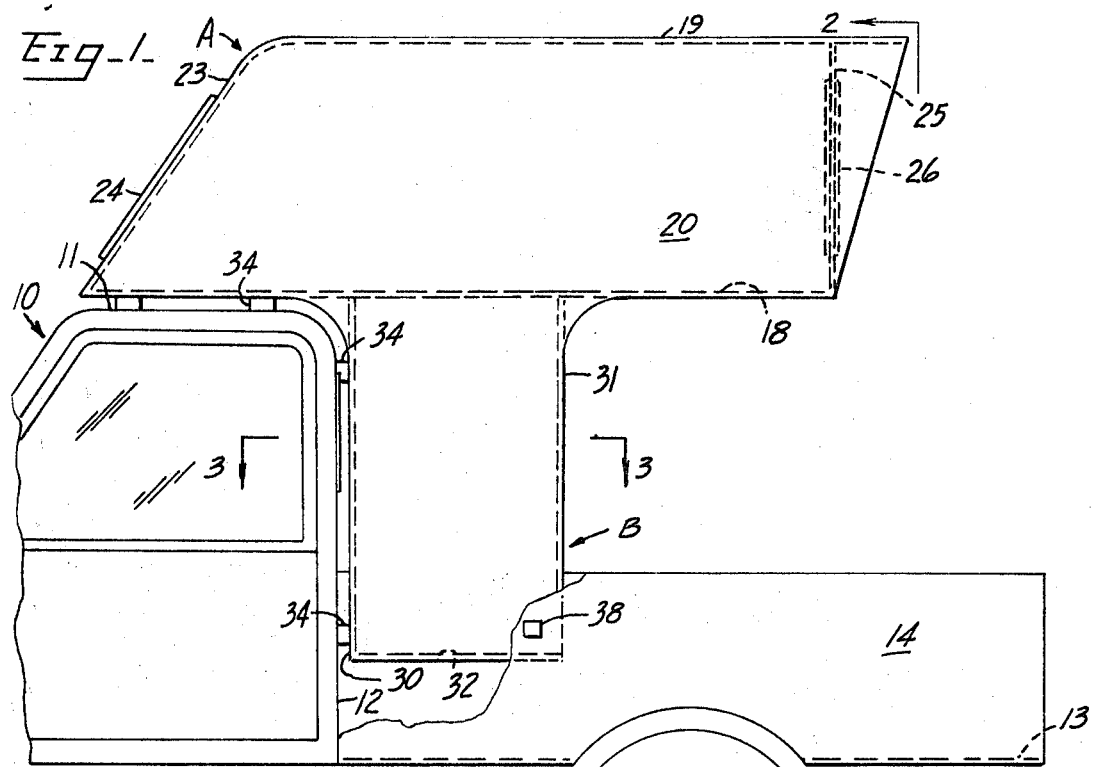
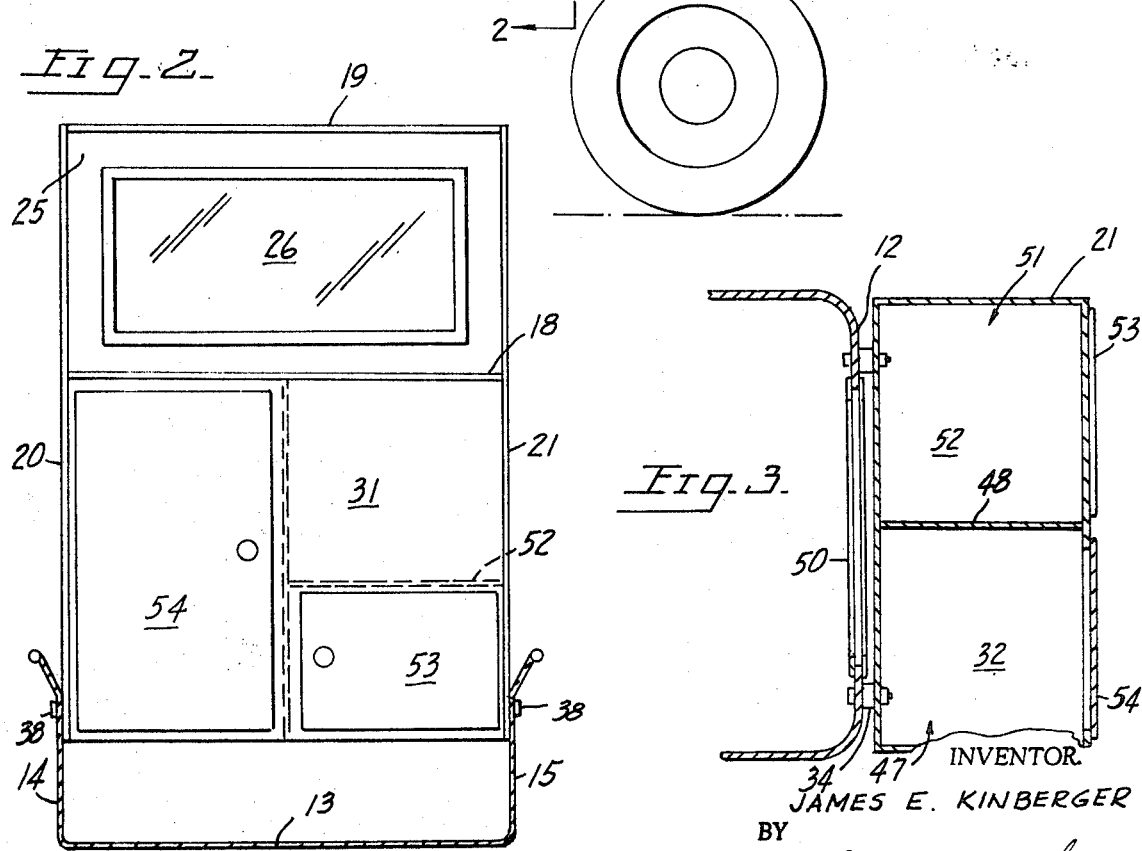
INVENTOR.
JAMES E. KINBERGER
BY Gordon Wood Patented May 29, 1973
3,736,019
2 Sheets-Sheet 2
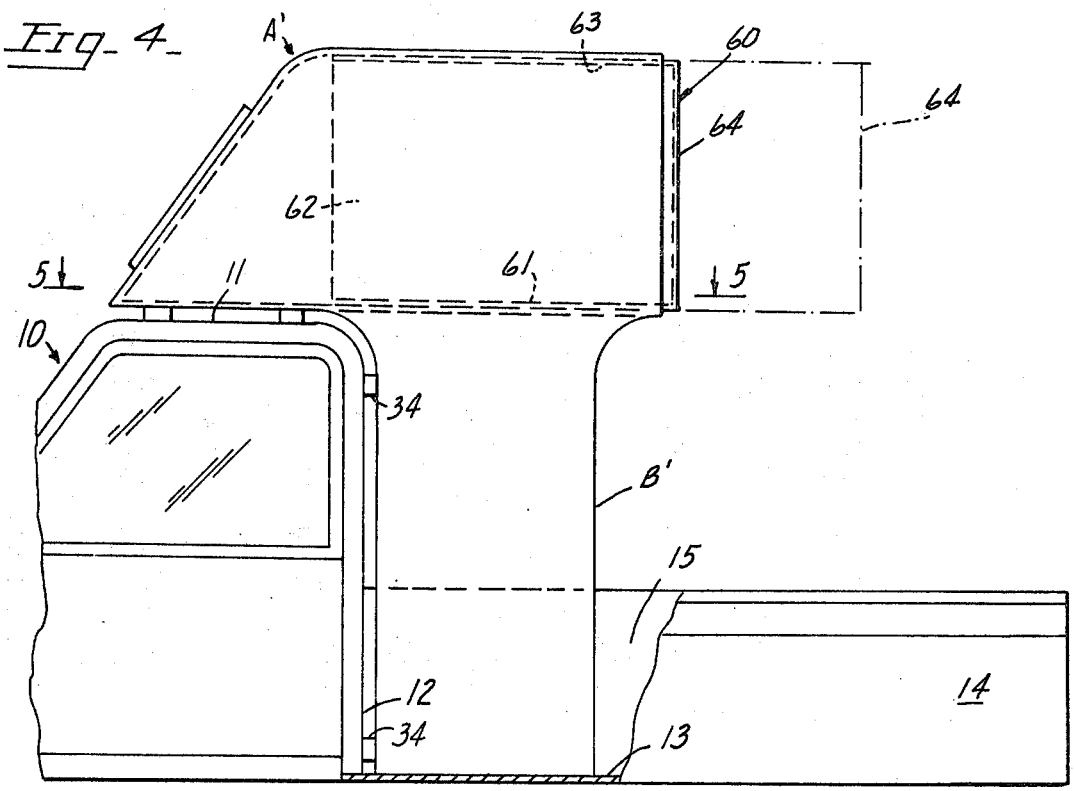
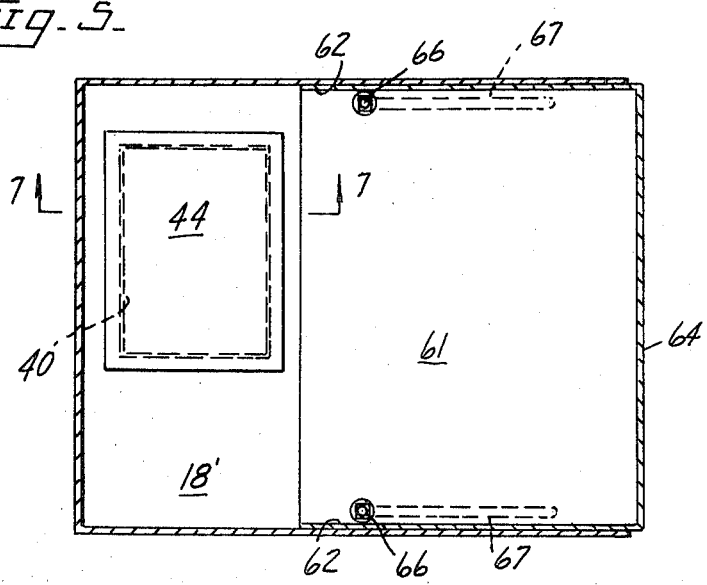
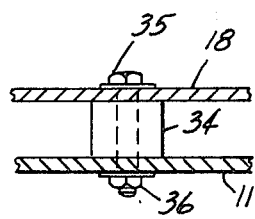
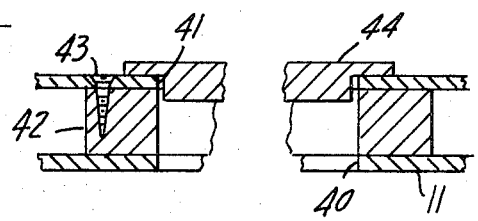
INVENTOR.
JAMES E. KINBERGER
BY
Gordon Wood.

CAMPER

This invention relates to a camper body which is adapted to be applied to a conventional truck having a driver's cab and a load carrying bed rearwardly of said cab. Heretofore campers of an analogous type have been designed to provide a sleeping space and at the same time provide space for other materials such as cooking stoves, utensils and the like. One disadvantage of prior art campers is that the entire body of the truck is taken up with the camper body so that the utility of the truck body is lost. It is the main object of the present invention to provide a camper body which may be employed with a truck and at the same time leave a major portion of the truck body and truck bed unobstructed for its usual function of hauling articles.

Another object of the invention is the provision of a camper body having a compartment sufficiently large to permit two people to sleep therein and at the same time leave a major portion of the truck bed unencumbered for use in hauling articles.

Still another object of the invention is the provision of a combination camper and truck body wherein access is provided between the cab and the sleeping compartment thereby insuring security for the occupants and at the same time permitting a person access to the two spaces without having to go outside.

Yet another object of the invention is the provision of a camper body which lends itself to use with a conventional truck cab and truck body so that the connection between the camper body and the truck is extremely rigid.

Other objects and advantages of the invention will be apparent from the following specification and from the drawings:

FIG. 1 is a fragmentary side elevation of a conventional pickup truck showing one form of the camper body secured thereto.

FIG. 2 is a transfer sectional view through the truck bed showing the camper body in end elevation as taken in a plane indicated by lines 2—2 of FIG. 1.

FIG. 3 is a horizontal cross section through the rear wall of the cab and the pedestal of the camper body taken in a plane indicated by lines 3—3 of FIG. 1.

FIG. 4 is a view similar to FIG. 1 showing a modified form of the invention.

FIG. 5 is a horizontal section through the large compartment as taken in a plane indicated by lines 5—5 of FIG. 4.

FIG. 6 is a typical cross section through one of the connectors connecting the camper to the cab and similar to a view taken in a plane indicated by lines 6—6 of FIG. 5.

FIG. 7 is a fragmentary cross section through the access opening between the cab and the large compartment as taken in a plane indicated by lines 7—7 of FIG. 5.

In detail and first with reference to FIG. 1 the invention is adapted to be employed with a conventional pickup truck having a cab generally designated 10 which includes a top 11 and a rear wall 12. The truck also includes a load carrying bed 13 and a pair of opposite longitudinally extending sidewalls 14, 15 (FIG. 2).

The camper body comprises two main portions integrally connected together. Such portions are a relatively large horizontally disposed upper compartment generally designated A, and a generally vertically disposed pedestal portion generally designated B. The upper compartment has a lower floor 18 a top 19 and a pair of opposite sidewalls 20, 21 which may extend downwardly to provide the sidewalls of the pedestal portion B.

The front wall 23 preferably slants upwardly and rearwardly as indicated in FIG. 1 and is provided with a window generally designated 24. The rear wall 25 of the upper compartment is preferably vertical and is provided with a window generally designated 26. To provide a pleasing appearance consistent with the slanting forward surface of the cab 10 and the slanting of front wall 23 of the upper compartment the rear edges of sidewalls 20, 21 may extend slantingly upwardly and rearwardly to connect with a rearward extension of the top 19 as indicated in FIG. 1.

The pedestal portion B of the camper is provided with a front wall 30, a rear wall 31 and a bottom wall 32. As stated above the sidewalls of pedestal B may be integral continuations of sidewalls 20, 21 of the upper compartment A.

It will be seen at this point that the construction of the camper including the rigid sidewalls 20, 21 creates an extremely strong structure which may be fixedly secured to the similarly rigid top and rear wall of the cab 10. As seen in FIG. 1 the bottom or floor 18 of upper compartment A is spaced slightly upwardly from the top 11 of the cab and centrally apertured spacers 34, preferably at least four in number, are interposed between said floor 18 and the cab top 11. As best seen in FIG. 6 bolts 35 and nuts 36 may be employed to secure the camper to the top 11 of the cab. In a similar manner the connection of FIG. 6 may be employed to secure the front wall 30 of the pedestal portion B to the rear wall 12 of the cab. Additional support for the unit may be obtained by means of bolts 38 connecting the sides 20, 21 with the sidewalls 14, 15 respectively of the truck body. In view of the rigidity of the cab construction it will be seen that the weight of the camper body can be adequately resisted by the cab itself. For this reason the lower wall 32 of the pedestal B may be elevated somewhat from the bed 13 of the truck so that the truck may still be employed to handle long objects such as lengths of pipe, lumber, building supplies and the like which may be interposed at their forward ends beneath the pedestal B and the bed 13 of the truck. However as seen in FIG. 4 showing a modified form of the camper the pedestal B' may be long enough so that the lower wall 32' rests on the bed 13 of the truck. Naturally this construction results in less of a load being impressed on the cab.

One of the important features of the present invention is the provision of direct access between the cab and the upper compartment A. This is accomplished by providing an opening 40 (FIG. 7) in the top 11 of the cab and a similar opening 41 in the floor 18 of the upper compartment. A generally rectangular spacer frame 42 is provided around said openings and may be secured to the floor 18 by means of screws 43. The access opening thus formed may be closed by means of a cover 44 if desired (FIG. 5).

The left-hand side of pedestal B may be formed to provide a vertically elongated compartment 47 (FIG. 3) having an inner vertical wall 48. In FIG. 3 there is shown a frame 50 on a rear wall 12 of the cab which is adapted to receive a glass pane therein. This pane may be removed so as to provide access from the cab into a small upper compartment 51 on the right-hand side of pedestal B provided with a bottom 52. This compartment 51 greatly enhances storage space available from the cab space. Beneath the compartment 51 a lower compartment may be provided above the bottom wall 32 and such lower compartment may be provided with a door 53 (FIG. 2) for access from the bed of the truck. Similarly the vertically elongated compartment 47 may be provided with a rearwardly opening door 54.

The effective size of the camper may be reduced while traveling by telescoping a portion of the upper compartment A. Thus as best seen in FIG. 4 a generally rectangular inner member 60 may be telescopically received within the open rear end of compartment A'. Said structure 60 comprises a bottom wall 61 opposite sidewalls 62, upper wall 63 and end wall 64. In order to retain the telescopic structure 60 in its inner position a pair of bolts 66 may be passed through bottom wall 61 and through elongated slots 67 formed in floor 18' of pedestal A'. When the telescoped structure 60 is in its inner position the bolts 66 may be tightened to secure the structure in place. When it is desired to employ the upper compartment A' as a sleeping space the bolts 66 may be loosened and the structure 60 moved to its outer position as shown in dot dash lines in FIG. 4. In such outer position the bolts abutting the corresponding outer ends of slots 67 prevent further outward movement of the telescoped structure.

It will be apparent that the above described invention provides substantially all of the important features found in a conventional camper and at the same time permits the truck on which the camper is carried to be employed without substantial impairment of its customary functions. It will be understood that the particular size of the camper is not critical but preferably the upper compartments A and A' should be at least seven feet in length to provide a sleeping space. With respect to pedestal B it has been found that one having a depth in the direction of travel of the vehicle equal to about one-third of the length of the truck bed is large enough to accommodate a substantial number of articles and at the same time not to impair the use of the truck bed for hauling articles.

The material from which the camper is built may be metal, plywood, plastic sheeting or any combination thereof.

I claim:

1. In a vehicle having a driver's cab and a horizontally disposed load carrying bed rearwardly of said cab:
   means forming a relatively large compartment positioned over said cab and extending horizontally rearwardly thereof,
   a vertically disposed pedestal connected with said compartment at its upper end and extending downwardly alongside the rear side of said cab,
   said pedestal having a width in the direction of travel of said vehicle equal to less than one-half of the longitudinal extent of said bed,
   whereby the remaining portion of said bed is unobstructed to permit supporting articles thereon for hauling the same.

2. A vehicle according to claim 1 wherein said compartment and said pedestal are formed as an integral unit.

3. A vehicle according to claim 1 wherein said pedestal is hollow to form a storage space therein.

4. A vehicle according to claim 3 wherein said pedestal is provided with a door on one sidewall thereof permitting access to the interior of said pedestal.

5. A vehicle according to claim 4 wherein said door is on the rear sidewall of said pedestal.

6. A vehicle according to claim 1 wherein the bottom side of said pedestal is spaced upwardly from said bed.

7. A vehicle according to claim 1 wherein the bottom of said compartment and the top of said cab are provided with registering openings substantially less than the area of said top to allow access between said compartment and said cab.

* * * * *